Feb. 11, 1969 TUNG C. CHEN 3,427,597

MAGNETIC AND ELECTROSTATIC RECORDING TECHNIQUE

Filed March 19, 1964

INVENTOR
TUNG C. CHEN

BY Rene A. Kuypers

ATTORNEY

United States Patent Office 3,427,597
Patented Feb. 11, 1969

3,427,597
MAGNETIC AND ELECTROSTATIC RECORDING TECHNIQUE

Tung C. Chen, Villanova, Pa., assignor to Sperry Rand Corporation, New York, N.Y., a corporation of Delaware Filed Mar. 19, 1964, Ser. No. 353,095
U.S. Cl. 340—173 13 Claims
Int. Cl. G11b 5/00, 9/08

ABSTRACT OF THE DISCLOSURE

This invention relates to an arrangement for increasing the storage capacity on a homogeneous recording medium by magnetically recording information on one side of the medium and electrostatically recording information on the other side of the medium. In one form of the system, the magnetic and electrostatic write heads are located on opposite sides of the medium so that the carcass of the magnetic write and read heads serve respectively as the return electrode for the electrostatic write and read head.

Figure 1:
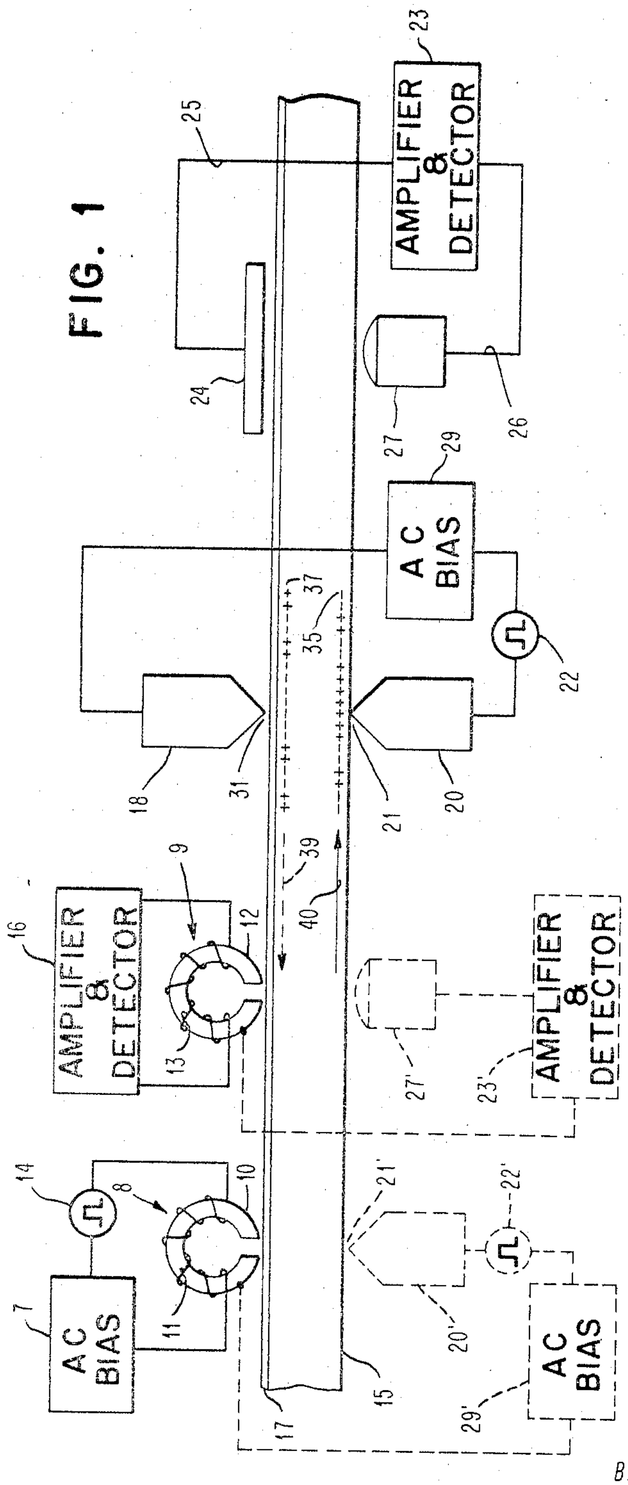

This invention relates in general to the storing of information on a recording medium. In particular, this invention relates to the recording of magnetic and electrostatic information on the same recording medium.

In a typical computer installation, the cost of magnetic tape over the years may exceed the actual manufacturing cost of the computer itself. Hence, it is economically important to reduce the price of tape, or alternately, to increase the packing density of information stored thereon in order that overall savings might be achieved.

It is therefore an object of the instant invention to increase the storage capacity of a recording medium.

It is still a further object of the instant invention to magnetically and electrostatically store information on the same recording medium.

It is also a further object of the instant invention to magnetically and electrostatically read information from the same recording medium.

Yet a further object of the instant invention resides in the simultaneous recording of information both magnetically and electrostatically on a recording medium.

Still another object of the instant invention resides in the provision for the simultaneous reading both magnetically and electrostatically of information from a recording medium.

In accordance with a feature of this invention, a technique to increase the packing density of recorded information has been devised which comprises storing information both magnetically and electrostatically on the same recording medium. To accomplish this result, a magnetic coating is placed on one side of a plastic tape. Contiguous to the magnetic coating are arranged magnetic read and write heads for the respective reading and writing of magnetic information. Positioned in juxtaposition to the non-magnetic surface of the tape are an electrostatic read head and a write electrode to achieve, respectively, the electrostatic reading and recording of information.

In accordance with a further feature of this invention, the electrostatic read head and the magnetic read head are positioned on either side of the recording medium and opposite one another; similarly, the electrostatic write electrode and the magnetic write head are positioned on either side of the recording medium and opposite from one another. By means of the above expedients, the carcass or yoke of the magnetic write head serves as a ground or return path for the electrostatic write electrode. Therefore, bits of information can be recorded magnetically and electrostatically at the same location on the tape as well as being recorded simultaneously. Similarly, the electrostatic read head can be positioned directly opposite the magnetic read head so that magnetic and electrostatic reading may take place at the same location of the tape. As in the case with a write cycle, the magnetic and electrostatic read cycle may take place simultaneously.

Figure 2:
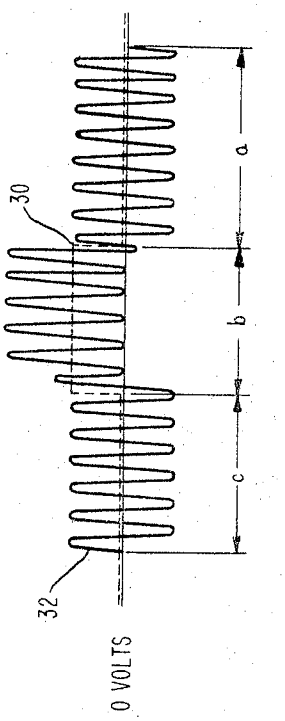

The novel features that are considered characteristic of this invention are set forth with particularity in the appended claims. The invention itself, however, both as to its organization and method of operation, as well as additional objects and advantages thereof, will best be understood from the following description when considered in conjunction with the accompanying drawings, wherein:

FIGURE 1 depicts magnetic and electrostatic read and write heads oriented on either side of a recording medium wherein the associated circuitry is shown in block form; and FIGURE 2 depicts an information signal, which is to be recorded electrostatically on the recording medium of FIGURE 1, the charge pattern on the recording medium of FIGURE 1 corresponding to the information signal of FIGURE 2.

In operation, the instant invention is designed to record and read information magnetically and electrostatically on the same recording medium. Thus, a magnetic write and read head placed contiguous to a magnetic layer formed on a plastic tape can record and read information in a conventional manner. The magnetic recording surface coated on the tape comprises a very thin iron oxide or magnetic alloy coating formed by an electroless or other process and the recording head is arranged to record information in accordance with a prescribed signal. During the read cycle, as the tape having the above-mentioned signal recorded thereon passes beneath a magnetic read head, a corresponding electrical signal is induced in the read head which is detected and reproduced by appropriate electronic circuitry.

In order to record electrostatically, electrodes are arranged perpendicularly on either side of the tape. The two electrodes, which are positioned contiguously to the tape, are shaped in the form of knife edges so that during a recording cycle a radio frequency corona discharge can be developed. The corona discharge serves as a medium to transmit the required information signal to the tape. The information voltage is superimposed upon, that is, mixed with the radio frequency. In other words, the plastic tape is passed between electrodes whose potential difference corresponds to the signal to be recorded. The information signal is transmitted via a small localized gas discharge (corona) and an electrical charge pattern corresponding to the information signal is distributed along the tape.

Reading of the electrostatic recording is accomplished when the tape passes by an electrostatic pick-up probe. A voltage waveform corresponding to the charge pattern is induced in the pick-up probe and the recorded information is recovered and reproduced by appropriate electronic circuitry.

The instant invention can be adapted so that the electrostatic read and write heads can be positioned directly opposite the corresponding magnetic read and write heads. In this manner, the carcass of the magnetic write head serves as the ground or return path for the electrostatic write electrode and similarly, the carcass of the magnetic read head serves as ground for the electrostatic read electrode. In view of the above-discussed arrangement, a magnetically recorded bit and an electrostatically recorded bit can be located at the same spot on the tape if required. Furthermore, the writing and reading of information bits by each different method can be performed simultaneously.

Referring now to the drawings, and in particular to

FIGURE 1, there is depicted the magnetic and electrostatic recording apparatus required to record information magnetically and electrostatically on the same recording medium. Thus, the magnetic recording head 8 is shown positioned juxtaposed to the magnetic coating 17 of the plastic tape 15. The plastic tape 15 consists of a dielectric polyester film wherein the magnetic recording surface 17 comprises a thin coating (approximately .0006 of an inch or less) or iron oxide or a magnetic alloy formed by an electroless or other process. As is well known in the art, the magnetic recording head 8 is made up of a metal carcass or yoke 10 having several turns of wire 11 in the form of a coil positioned thereon. The coil 11 around the metal carcass 10 comprises an electromagnet when it is connected to an appropriate pulse signal source 14 and an A.C. bias 7. It should be understood at this juncture that although the invention will be described in connection with a data processor, a pulse signal operation, it can be employed with an A.C. signal such as a music signal. Hence, signal source 14 can be an A.C. signal.

The open end portion of the yoke 10 serves as the poles of the electromagnet. The magnetic coil 11 and the yoke 10 including the pole assembly comprise the write head 8. Information to be recorded from the signal source 14 is passed through the coil 11 and as the magnetic tape 15 is drawn passed the poles of the electromagnet in the direction of the arrow 40, the information signals are recorded on the magnetic coating 17 of the tape as varying directions of magnetization. Obviously, in an A.C. signal mode the information would be recorded as varying degrees of magnetization. In other words, the pulse signal source 14 mixed with the A.C. bias 7 causes the magnetic di-poles of the magnetic portion 17 of the tape 15 to be oriented in accordance with the information signal to be recorded.

To reproduce the signal recorded on the magnetic coating 17, the tape 15 is rewound on a tape-up reel (not shown) in the direction of the arrow 39 and then is drawn in the direction of the arrow 40 over the poles of a magnetic read head 9. The read head 9 is similar in design to the magnetic recording head 8, which was previously discussed. The read head 9 comprises a metal carcass 12 around which is placed the wire coil 13. The coil 13 is connected to an appropriate amplifier and detector circuit 16. When the tape 15 is drawn over the poles of the magnetic read head 9, magnetic impulses generate a varying voltage in the coil 13 corresponding to the stored information signals. The voltage signals are then passed through the amplifying detector circuit 16 and to appropriate data processor equipment or sound reproducing equipment (not shown). It should be understood, that the magnetic read head 9 and the magnetic write head 8 discussed above embody only one such technique and other variations can be employed without departing from the spirit of the instant invention.

The electrostatic recording apparatus comprises the knife-shaped electrodes 18 and 20 positioned on either side of the tape 15. The electrodes 18 and 20 are arranged in accordance with an A.C. recording scheme, which incorporates an A.C. bias 29 in conjunction with a pulse signal source 22. If an A.C. information signal is to be recorded the signal source 22 would be generating an A.C. signal In order to record information electrostatically on the tape 15 (a dielectric or insulating medium), the A.C. bias 29 generates an RF, high voltage signal of approximately 2,000 volts. This high frequency, high voltage signal sets up a corona field (i.e., a discharge caused by the ionization of the surrounding air) between the knife edges 21 and 31 of the respective electrodes 20 and 18. The generated corona field serves to provide a medium (hereinafter called a carrier) by which an equal number of electrons are transmitted and removed from the tape and the equal number of electrons being transmitted to and from the tape serve to erase previous information. Electrostatic recording therefore requires that there be an unequal transfer of electrons to and from the dielectric recording medium and this transfer takes place via the conducting path of ionized air (electrically charged atoms).

As the tape 15 passes in the direction of arrow 40 between electrodes 18 and 20, it is charged to the average potential of the region, which corresponds to the instantaneous value of the information signal from the pulse signal source 22 mixed with the carrier 32 (FIGURE 2). In other words, the varying potential which emanates from the signal source 22 is transmitted by the localized, high voltage corona discharge and as a result electrons are injected into and extracted from the tape 15 in accordance with the information signal to be recorded. The injected negative charges (electrons) and positive charges (removal of electrons) are driven into the tape 15 to provide long-lived recordings in contra-distinction to surface charges, which are relatively short-lived. More specifically, the electrode geometry (knife edges) and the applied potential from signal source 22 mixed with the carrier 32 produces a unique distribution of positive and negative electrical charge on the film in a pattern corresponding to information signals. In an actual A.C. electrostatic recording embodiment, the data signals emanating from the pulse signal source 22 comprise relatively high voltage pulses of approximately 500 volts.

By referring to the portion of the tape 15 in the vicinity of the recording electrodes 18 and 20, a charge distribution pattern representing a certain information signal is shown. The signal to be recorded on the tape 15 and corresponding to the charge pattern of FIGURE 1 is depicted in FIGURE 2 as a carrier 32 with a mixed information pulse (the square wave 30 in dotted form). The carrier 32 assumes the average potential of the square wave 30 and therefore is shown superimposed thereon. Before correlating the charge pattern of FIGURE 1 with the signal pattern of FIGURE 2, it should be noted that the plastic tape 15 is considered to be electrically neutral, that is, there are as many positive charges as there are negative charges along the entire portion of the tape. The injection and extraction of electrons to provide a required information pattern takes place along the surface contiguous to the knife edge 21 of the electrode 20. In response to electrons being injected or extracted from the surface contiguous to knife edge 21, electrons leave or return to the surface contiguous to knife edge 31.

Considering the electrical charge on the tape 15 area closest to the knife edge 21 beginning from the extreme right and extending to the left while dividing this length into bracketed thirds, it is observed that in the first bracketed third (i.e., from the right) there are several negative charges separated by several positive charges. These charges are in reality very close together. This first bracketed third section of the tape 15 corresponds to the length *a* of the signal of FIGURE 2 as the tape travels in the direction of arrow 40. Since no information signal is to be recorded at this time, the only signal passing between the electrodes 21 and 31 is the corona signal 32 (the carrier medium). The corona signal both injects electrons and removes electrons from the tape 15 and hence where a negative charge is shown near the knife edge 21, it indicates that electrons have been injected into the tape and where a positive charge appears, electrons have been removed from the tape. In other words, section *a* (FIGURE 2) of the information signal has an average potential of "zero" volts and hence only the carrier medium 32 is indicated. It will be explained in some detail in a later paragraph how during a read cycle, the read head 27 interprets the above-discussed charge pattern as having an average potential of "zero" volts.

As it was stated earlier, the tape 15 is electrically neutral, which means that for each negative charge along the surface near the knife edge 21 there must be a corresponding positive electrical charge within the tape and similarly, where positive charges appear there must be a corresponding negative charge. By way of example, for the negative charge 35 injected into the tape 15, there is a corresponding positive charge 37.

Referring now to the middle bracketed third of the charged tape 15, it is apparent that a plurality of electrons have been extracted to leave positive charged ions positioned along the edge of the tape 15 near the knife edge 21 of the electrode 20. This electrostatic charge pattern corresponds to section *b* of FIGURE 2. These electrons are extracted from the tape 15 whenever the signal produced by the pulse source 22 (i.e., square wave 30) is mixed with the carrier medium 32. This signal mixing causes a D.C. voltage component between electrodes 18 and 20 so that current flows in the external circuitry between the electrodes 18 and 20 whereby as the tape 15 passes through the corona, it is charged to the average D.C. potential of the region. Since the average D.C. potential of the signal 30 mixed with the carrier medium 32 is in a positive direction, electrons are withdrawn from the region around the knife edge 21 leaving positively charged ions along the tape 15.

As discussed above, the tape 15 is electrically neutral so that for each positive charge there must be a corresponding negative charge. Thus, to indicate a neutralized condition of the tape 15, negative charges are indicated along the magnetic coating 17 vis a vis the positive charges. In other words, the information signal 30 is recorded electrostatically on the tape 15 by means of a net current flow in the circuit which orients the positive and negative charges as shown, although there is no overall net change of the total charge of the tape since the latter is electrically neutral.

The charge pattern along the last bracketed third of the tape 15 corresponds to section *c* of FIGURE 2 and is similar to the charge pattern along the first bracketed third of the tape (corresponding to section *a* of FIGURE 2). In the last bracketed third, the tape 15 is in an erase condition, i.e., the charge pattern has several positively charged areas which are interspersed with several negatively charged areas, thereby indicating that the average potential of the corona field is "zero" volts. More specifically, the charge pattern corresponding to section *c* as well as *a* of the waveform in FIGURE 2 indicates that as many negative charges are removed as are injected into the tape 15 and a transducer attempting to read such information detects a "zero" overall electrostatic charge.

The reading cycle for electrostatic recording takes place when the tape 15, having the charge pattern of FIGURE 1, passes the electrostatic pick-up or read probe 27 in the direction of the arrow 40. A voltage waveform corresponding to the mixed signal of FIGURE 2 is thereby induced in the read probe 27 and the recorded information is recovered in the amplifier and detector circuit 23. The amplifier and detector circuit 23 comprises a high input resistance, low input capacitance amplifier. The circuit is closed by means of the ground plane 24, which is positioned on the opposite side of the tape 15 from the read head 27. The ground plane 24 and the read probe 27 are connected to the amplifier 23 via the connections 25 and 26.

As the charge pattern of FIGURE 1 corresponding to section *a* of FIGURE 2 passes by the read head 27 no net charge is induced therein. This results from the fact that the read probe 27 is relatively wide so that substantially equal numbers of positive and negative charges are present when reading this section of the tape. Section *a* of FIGURE 2 therefore represents an erased portion of tape whose average potential is equal to "zero" volts.

When the charge pattern on the tape 15, corresponding to the section *b* of FIGURE 2, passes beneath the read probe 27, the latter sees an excess of positive charges on the tape and negative charges are thereby induced in the probe. The negative charges induced in the read probe 27 are drawn from the grid electrode of the input triode (not shown) of the amplifier and detector circuit 23, thereby causing the grid to become positive. In other words, the polarity of the voltage appearing at the grid of the high impedance triode amplifier circuit corresponds to the positive electrostatic charge pattern which passes beneath the read probe 27. It was noted previously that the ground plane 24 completes the electrostatic read circuit. The ground plane 24 in one particular embodiment is connected to the grounded cathode of the above-mentioned input triode. In order to complete the circuit, the ground plane which is connected to the grounded cathode of the input triode has positive charges induced therein, the positive charges being drawn from the grounded cathode of the input triode stage. Hence, the cathode is negative with respect to the grid, it being recalled that the latter was made positive by the induction process. Therefore, the input stage is made conductive and the pulse 30 is detected.

The voltage induction process discussed above may be expressed mathematically as follows:

$$E_n = KQ/C$$

wherein $E_n$ is the voltage induced, Q is the amount of charge on the tape, and C is the total input capacitance of the amplifier and detector circuit. The efficiency factor of the read cycle is designated as K and is inserted in the equation because not all of the "electrostatic flux" lines from the charges on the tape 15 terminate on the read probe 27 and therefore, less voltage is induced than is commensurate with the charge on the tape.

When a charge pattern corresponding to section *c* of FIGURE 2 passes beneath the read head 27 no net charge is induced therein for the same reasons as were discussed with regard to section *a*. Thus, when the tape 15 passes by the pick-up probe 27 in conjunction with the ground plane 24, a voltage waveform whose average potential is "zero" volts is induced in the amplifier circuit 23. This voltage waveform represents an "erase" signal as previously mentioned.

In another embodiment of the instant invention, it is sometimes desirable that the electrostatic read and write heads 20′ and 27′ be positioned directly opposite the magnetic read and write heads, 8 and 9, respectively. Such an orientation may be desirable, for example, whenever the same information is to be recorded both magnetically and electrostatically at the same position of the tape and at the same time. The desirability of such a feature occurs when the information recorded magnetically is to be duplicated electrostatically. In the digital recording art, for example, it is oftentimes necessary to make certain that the information stored on a tape is correctly recorded. Therefore, by means of the dual recording technique described above, the electrostatic recording may be compared to the magnetic recording and if there is coincidence of the information, it is an indication that the information is correctly stored or written on the tape. It should be understood, however, that for checking purposes the magnetic and electrostatic heads need not be opposite one another.

In accordance with the above technique, the electrostatic read and write heads are positioned directly opposite the corresponding magnetic read and write heads. In this manner, the carcass 10 of the magnetic write head serves as the return electrode for the electrostatic write electrode 20′ and in like manner, the carcass 12 of the magnetic read head serves as the return ground plane for the electrostatic read probe 27′. In all other respects, this arrangement works in the same manner as that previously described for electrostatic recording and reading. Thus, the corona necessary for electrostatic recording is provided by the A.C. bias circuit 29′ and the information signal is provided by the pulse source 22′. Similarly, the read probe 27′ completes its circuit through the carcass of magnetic read head 9, which acts as a ground plane corresponding to the ground plane 24. The signal is recovered through the amplifier and detector circuit 23'.

In summary, the instant invention provides a system to increase storage capacity of recorded information on a plastic tape medium. The technique involved comprises placing a magnetic coating on one surface of a plastic tape so that conventional magnetic recording and reading can take place thereon. The surface of the tape opposite the magnetic coating is utilized to record electrostatically by means of knife-edge electrodes which are positioned on either side of the tape. A charge pattern in accordance with the information signal desired is provided by means of an A.C. or D.C. electrostatic recording technique. It is therefore apparent, that the storage capacity of present day recording tape can be increased twofold by utilizing the surface opposite the magnetic coating by recording electrostatically. The instant invention is of advantage since conventional techniques would experience interference problems when both sides of the tape are used. Furthermore, the instant invention can be modified to record information magnetically and electrostatically at the same location of the tape and if desired, both recordings can be performed simultaneously. Similarly, magnetic and electrostatic recordings can be read at the same location and simultaneously.

Obviously, many modifications and variations of the present invention are possible in the light of the above teachings. It is therefore to be understood that within the scope of the appended claims the invention may be practiced otherwise than as specifically described.

The embodiments of the invention in which an exclusive property or privilege is claimed are defined as follows:

1. An information recording device comprising: a homogeneous medium of substantially non-electrical conducting material having first and second surfaces; a magnetizable coating bonded adjacent to said first surface of said medium; means to magnetically record a first information signal on said magnetizable coating; means to electrostatically record a second information signal on said second surface of said medium, said means to magnetically record providing the electrical return path for said electrostatic record means.

2. An information reading device comprising: a homogeneous medium of substantially non-electrical conducting material having first and second surfaces; a magnetizable coating bonded adjacent to said first surface of said medium; means for reading a first information signal, said first signal being magnetically recorded on said magnetizable coating; means for reading a second information signal, said second signal being electrostatically recorded on said second surface of said medium, said means to magnetically read providing the electrical return path for said electrostatic read means.

3. An information reading device in accordance with claim 2 wherein said means for reading said first information signal and said means for reading said second information signal are positioned directly opposite from each other.

4. An information recording device comprising: a homogeneous medium of substantially non-electrical conducting material having a porosity with respect to electrical charges, said medium having first and second surfaces; a magnetizable coating bonded adjacent to said first surface of said medium; means for generating a magnetic field in accordance with a first information signal, said means for generating a magnetic field being disposed in close proximity to said magnetizable coating to cause said first information signal to be recorded on said magnetizable coating; means for generating electrical charges in accordance with a second information signal, said means for generating electrical charges being disposed in close proximity to the second surface of said medium to record said second information signal by injecting charges into said homogeneous medium, said means for generating a magnetic field providing an electrical return path for said means for generating electrical charges.

5. An information recording device in accordance with claim 4 wherein said first and second signals recorded on said magnetizable coating by said means for generating a magnetic field and on said second surface of said medium by said means for generating electrical charges comprise binary information.

6. An information recording device comprising: a homogeneous medium of electric insulating material having a surface porosity with respect to electrical charges, said medium having first and second surfaces; a magnetizable coating being bonded adjacent to said first surface of said medium; magnetic transducer means adapted to be connected to a signal mixing means and a bias means to generate magnetic flux in accordance with said signal mixing means, said magnetic transducer means being disposed in close proximity to said magnetizable coating on said medium to record a first information signal; electrostatic transducer means for generating electrical charges adapted to be connected to a signal mixing means and a bias means, said electrostatic transducer means being disposed in close proximity to the second surface of said medium to record a second information signal by injecting charges into said homogeneous medium, said magnetic transducer means providing an electrical return path for said electrostatic transducer means.

7. An information recording device in accordance with claim 6 wherein said magnetizable coating comprises a thin iron-oxide layer.

8. An information recording device comprising: a homogeneous medium of electrical insulating material having a surface porosity with respect to electrical charges, said medium having first and second surfaces; a magnetizable coating being bonded adjacent to said first surface of said medium; a magnetic write head adapted to be connected to signal mixing means and a bias means to generate magnetic flux in accordance with said signal mixing means, said magnetic write head being disposed in close proximity to said magnetizable coating on said medium to record a first information signal; an electrostatic write head generating electrical charges and adapted to be connected to a signal mixing means and a bias means, said electrostatic write head being disposed in close proximity to said second surface of said homogeneous medium to record a second information signal by injecting charges into said medium, said magnetic write head providing a second electrode for said electrostatic write head.

9. An information recording means according to claim 8 wherein said magnetic write head and said electrostatic write head are disposed directly opposite from each other.

10. An information recording means in accordance with claim 9 wherein said magnetic write head and said electrostatic write head record said respective first and second information signals simultaneously.

11. An information recording and reading device comprising in combination: a homogeneous medium of substantially non-electrical conducting material having a surface porosity with respect to electrical charges, said medium having first and second surfaces; a magnetizable coating bonded adjacent to said first surface of said medium; means for magnetically recording a first information signal on said magnetizable coating, said means for magnetically recording being positioned in close proximity to said magnetizable coating; means for reading said first information signal recorded magnetically on said magnetizable coating, said means for reading said first information signal being positioned in close proximity to said magnetizable coating; means for electrostatically recording a second information signal by injecting charges into said second surface of said medium, said means for electrostatically recording said second information signal being positioned in close proximity to said second surface of said medium; means for reading said second information signal recorded electrostatically on said second surface of said medium, said means for reading said second information signal being positioned in close proximity to said second surface of said medium, said means for magnetically recording and reading providing, respectively, an electrical return path for said means for electrostatically recording and reading.

12. The combination comprising: a homogeneous medium of substantially non-electrical conducting material, said medium having first and second surfaces; a magnetizable coating bonded adjacent to said first surface of said medium; a magnetic write head juxtaposed to said magnetizable coating; an electrostatic write head juxtaposed to said second surface of said medium and opposite said magnetic write head, the carcass of said magnetic write head providing a return circuit path for said electrostatic write head.

13. The combination in accordance with claim 12 wherein said combination further includes a magnetic read head which is juxtaposed to said magnetizable coating and an electrostatic read head which is juxtaposed to said second surface of said medium and opposite said magnetic read head, the carcass of said magnetic read head providing a return circuit path for said electrostatic read head.

References Cited

UNITED STATES PATENTS

| | | | |
|---|---|---|---|
| 3,040,124 | 6/1962 | Camras | 346—74 |
| 2,857,290 | 10/1958 | Bolton | 346—74 |
| 3,239,841 | 3/1966 | Henkes | 346—74 |

STANLEY M. VRYNOWICZ, Jr., *Primary Examiner.*

LEE J. SCHROEDER, *Assistant Examiner.*

U.S. Cl. X.R.

179—100.1; 346—74